US011530943B2

(12) United States Patent
Quint et al.

(10) Patent No.: US 11,530,943 B2
(45) Date of Patent: Dec. 20, 2022

(54) TECHNIQUES FOR CHECKING STATE OF ANALYZERS

(71) Applicant: Roche Diagnostics Operations, Inc., Indianapolis, IN (US)

(72) Inventors: Stefan Quint, Munich (DE); Dieter Kempken, Weilheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 95 days.

(21) Appl. No.: 17/066,692

(22) Filed: Oct. 9, 2020

(65) Prior Publication Data

US 2021/0116290 A1  Apr. 22, 2021

(30) Foreign Application Priority Data

Oct. 18, 2019 (EP) .................................... 19204016

(51) Int. Cl.
*G01F 25/20* (2022.01)
*G01F 3/22* (2006.01)
*G01N 35/10* (2006.01)

(52) U.S. Cl.
CPC .............. *G01F 25/20* (2022.01); *G01F 3/224* (2013.01); *G01N 35/1009* (2013.01)

(58) Field of Classification Search
CPC .. G01F 25/20; G01F 25/0084; G01F 25/0092; G01F 25/11; G01F 25/15; G01F 25/22; G01F 25/24; G01F 3/224; G01F 3/00; G01F 3/22; G01F 3/223; G01F 3/36; G01F 3/38; G01F 17/00; G01F 22/02; G01N 35/1009; G01N 35/10;

(Continued)

(56) References Cited

U.S. PATENT DOCUMENTS 4,236,404 A * 12/1980 Ketchum ........... G01N 33/2841
73/19.02
4,602,923 A * 7/1986 Bernstein .............. F24D 19/083
96/201

(Continued)

FOREIGN PATENT DOCUMENTS

CN      105019841 A   * 11/2015
CN      105739578 B   *  8/2018 ............. B01D 19/00

(Continued)

OTHER PUBLICATIONS

Wikipedia Contributors. (2019d, Sep. 29). Henry's law. Wikipedia. Retrieved Mar. 17, 2022, from https://web.archive.org/web/20191001230622/https://en.wikipedia.org/wiki/Henry%27s_law (Year: 2019).*

*Primary Examiner* — Daniel R Miller
*Assistant Examiner* — Eric Sebastian Von Wald
(74) *Attorney, Agent, or Firm* — Roche Diagnostics Operations, Inc.

(57) ABSTRACT

An automated method for detecting and/or monitoring a state of a degasser of an analyzer is provided, the degasser including a container configured to be evacuated. The method includes obtaining a time series of values indicative of pressures inside the container. The time series spans a period during which the container is evacuated or pressurized. The method further includes determining a liquid level state of the degasser which is determined by an amount of liquid present in the container based on the time series.

19 Claims, 8 Drawing Sheets

(58) Field of Classification Search
CPC ....... G01N 35/1016; G01N 2035/1018; G01N 2035/1025; G01N 2291/02836; C09K 3/32; C02F 1/20; F23J 15/022; F28B 9/10; F28F 2265/18; Y10S 261/00; Y10S 261/19; Y10S 165/917; H01J 9/39; G03D 2203/0658; G05B 2219/24085; G05B 2219/35376; E21B 47/003; F16K 21/18
See application file for complete search history.

(56) References Cited

U.S. PATENT DOCUMENTS

| | | |
|---|---|---|
| 5,183,486 A | 2/1993 | Gatten et al. |
| 2016/0144362 A1 | 5/2016 | Lee et al. |

FOREIGN PATENT DOCUMENTS

| | | | | |
|---|---|---|---|---|
| CN | 112165899 A | * | 1/2021 | ............... A61B 5/01 |
| DE | 69732080 T2 | * | 1/2006 | .......... B41J 2/17513 |
| DE | 112013001604 T5 | * | 3/2015 | ............. G01N 11/08 |
| EP | 1007973 B1 | * | 12/2004 | ............. B01L 3/0265 |
| EP | 2884190 A1 | * | 6/2015 | ......... B01D 19/0036 |
| EP | 3335568 B1 | | 3/2019 | |
| FR | 2908859 A1 | * | 5/2008 | ............ F17C 13/021 |
| JP | H09-85011 A | | 3/1997 | |
| JP | H09-150008 A | | 6/1997 | |
| JP | H09-150009 A | | 6/1997 | |
| JP | 2001-070707 A | | 3/2001 | |
| JP | 2006-297200 A | | 11/2006 | |
| JP | 2007-278739 A | | 10/2007 | |
| JP | 2008-036489 A | | 2/2008 | |
| JP | 2011-104508 A | | 6/2011 | |
| JP | 2012-225786 A | | 11/2012 | |
| JP | 2014-062827 A | | 4/2014 | |
| JP | 2015-114252 A | | 6/2015 | |
| WO | 2004/072586 A2 | | 8/2004 | |
| WO | 2016-098535 A1 | | 6/2016 | |

* cited by examiner

TECHNIQUES FOR CHECKING STATE OF ANALYZERS

CROSS-REFERENCE TO RELATED APPLICATIONS

This application claims priority to European Patent Application No. 19204016.0, filed 18 Oct. 2019, the disclosure of which is hereby incorporated by reference in its entirety.

TECHNICAL FIELD

This disclosure relates to automated methods for detecting and/or monitoring a state of an analyzer.

BACKGROUND

Automated analyzers (e.g., in-vitro analyzers) are widespread in today's laboratory and hospital environments. These devices tend to become more and more complex due to added functionalities and increased throughput and a requirement to perform analytical tasks in an automated manner. As a consequence, errors and malfunctions can occur in a multitude of components which might lead to decreased productivity of the analyzer or less reliable measurement results. In some examples, external service personnel might be required to spot and fix an error which can take many hours or even days during which an analyzer or part thereof are not available.

SUMMARY

It is against the above background that the present disclosure provides certain unobvious advantages and advancements over the prior art. In particular, the inventor has recognized a need for improvements in methods for determining an analyte concentration.

Although the embodiments of the present disclosure are not limited to specific advantages or functionality, it is noted that in accordance with the present disclosure the detecting and/or monitoring technique can be seamlessly integrated into existing analyzer workflows in some examples. For instance, the detecting and/or monitoring technique can be carried out as part of an analyzer initialization workflow. In some examples, the detecting and/or monitoring technique can use monitoring data (e.g., the vacuum pressure of a pump arranged to evacuate the container of the degasser) already generally available in the analyzer (e.g., to monitor the pump). In these cases, no additional hardware might be needed to carry out the detecting and/or monitoring techniques of the present disclosure.

Secondly, the technique can be employed to automatically monitor an aging of the degasser. This can be useful to predict a point in time were a degasser malfunction occurs, and potentially triggering and scheduling a preventive maintenance measure. For instance, a timespan long enough for external service personnel to arrive at the analyzer and to take care of a particular issue can be taken into account. This, in turn, might reduce a downtime of the analyzer.

Thirdly, the detecting and/or monitoring technique of the present disclosure can be employed to distinguish between different states of the degasser (e.g., a normal state, a subcritical state and a critical state) and trigger particular responses. In this manner, the detecting and/or monitoring technique of the present disclosure can facilitate employing resources (e.g., operator time or external service personnel) more efficiently by allowing a more precise allocation of these resources due to an improved knowledge of the degasser state. A downtime of the analyzer (or a module thereof) can also be reduced in some situations as the improved knowledge of the degasser state can be used to select a most appropriate response.

In accordance with one embodiment of the present disclosure, an automated method for detecting and/or monitoring a state of a degasser of an analyzer is provided, the degasser including a container configured to be evacuated. The method comprises obtaining a time series of values indicative of pressures inside the container, wherein the time series spans a period during which the container is evacuated or pressurized, and determining a liquid level state of the degasser which is determined by an amount of liquid present in the container based on the time series.

In accordance with another embodiment of the present disclosure, a computer system being configured to carry out the steps of the first embodiment of the present disclosure is provided.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
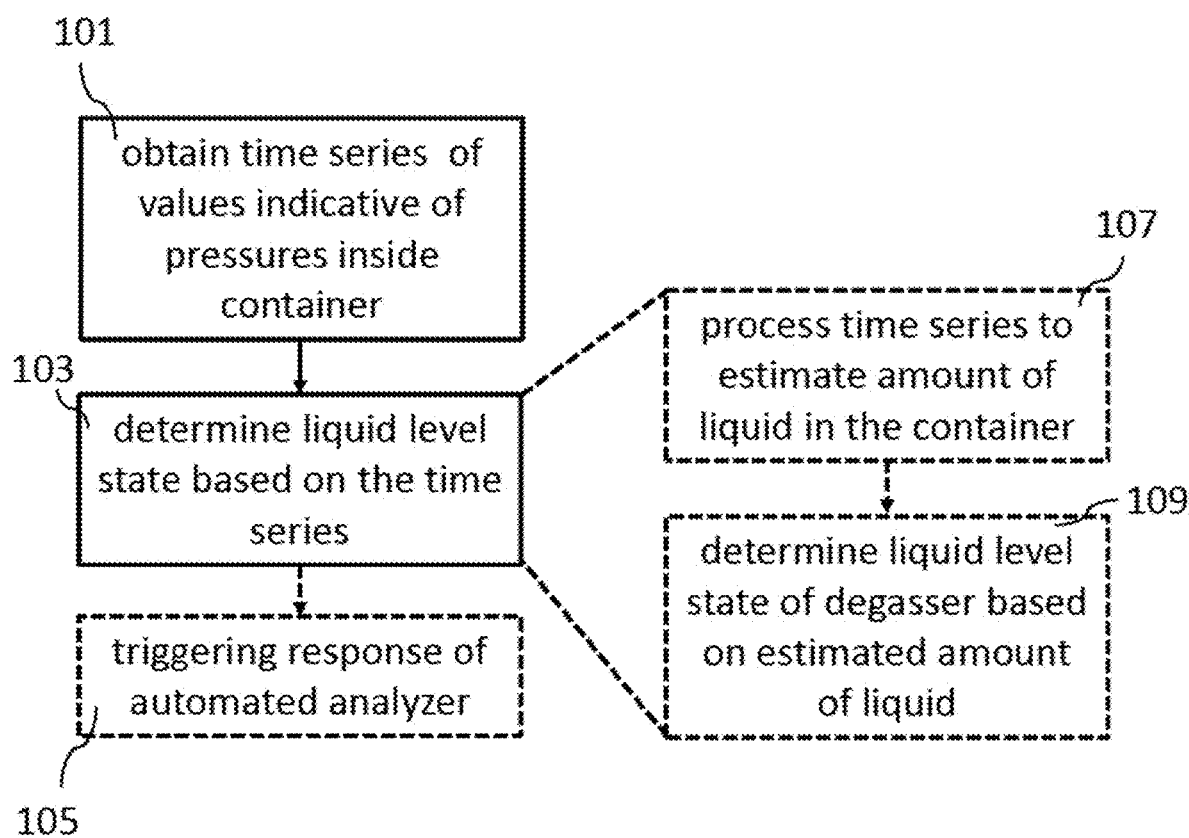
FIG. 1 is a flow diagram illustrating the detecting and/or monitoring techniques of the present disclosure.

Skilled artisans appreciate that elements in the figures are illustrated for simplicity and clarity and have not necessarily been drawn to scale. For example, dimensions of some of the elements in the figures may be exaggerated relative to other elements to help improve understanding of the embodiment(s) of the present disclosure.

DETAILED DESCRIPTION

Several terms are used as having a particular meaning in the present disclosure.

The term "vacuum" is used in the present disclosure as referring to a pressure level below a pressure level of the ambient environment of the space (e.g., a container of a degasser) containing the vacuum (i.e., the term is a relative measure and not an absolute measure). The term vacuum is not limited to situations in which the pressure level is below a certain fraction of the ambient pressure. It is understood that the term might refer to different pressure levels depending on a location of the analyzer and the resulting lower ambient pressure levels (e.g., a generally lower pressure level at higher altitudes and a generally higher pressure level at lower altitudes). In some examples, the term vacuum can refer to a pressure level being below 20% of an ambient pressure level. In some examples, the term vacuum can refer to a pressure level below 100 mBar (if the ambient pressure is above 100 mBar).

The terms "evacuation" and "pressurization" of an enclosure (e.g., a container of a degasser) refer to lowering and raising a pressure inside the container compared to an initial pressure value, respectively. The terms are not limited to situation where the respective pressure is raised above or lowered below an ambient pressure.

A "time series" according to the present disclosure refers to at least two values of a particular parameter at two different points in time. A time series can include (much) more than two values at respective points in time in some examples. In this example, a time series can include a (quasi-) continuous series of measurement values. The term "point in time" shall not define and/or limit a measurement window for obtaining a measurement value included in the time series to a particular accuracy. For instance, an averaged measurement value obtained by averaging over multiple measurements of a parameter can also be included in the time series according to the present disclosure.

An "analyzer" according to the present disclosure is a—usually at least partially automated—apparatus dedicated to perform an analytical function. In some examples, the analyzers can be configured to carry out to the analysis of samples (e.g., samples for in vitro diagnostics). For example, an analyzer can be a clinical diagnostics system for performing in vitro diagnostics.

The analyzers of the present disclosure can have different configurations according to the need and/or according to the desired workflow. Additional configurations may be obtained by coupling a plurality of apparatuses and/or modules together. A "module" is a work cell, typically smaller in size than the entire analyzer, which has a dedicated function. This function can be analytical but can be also pre-analytical or post-analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps.

In particular, the analyzers can comprise one or more analytical devices, designed to execute respective workflows that are optimized for certain types of analysis.

The analyzer can include analytical apparatuses for one or more of clinical chemistry, immunochemistry, coagulation, hematology, etc.

Thus, the analyzer may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative pre-analytical and/or post-analytical functions may be performed by units integrated in an analytical apparatus. The analyzer can comprise functional units such as liquid handling units for pipetting and/or pumping and/or mixing of samples and/or reagents and/or system fluids, and also functional units for sorting, storing, transporting, identifying, separating, detecting.

The term "sample" refers to a biological material suspected of containing one or more analytes of interest and whose detection, qualitative and/or quantitative, may be associated to a particular condition (e.g., a clinical condition).

The sample can be derived from any biological source, such as a physiological fluid, including, blood, saliva, ocular lens fluid, cerebral spinal fluid, sweat, urine, stool, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest.

The term "sample" is tendentially used to indicate a sample before sample preparation whereas the term "prepared sample" is used to refer to samples after sample preparation. In non-specified cases the term "sample" may generally indicate either a sample before sample preparation or a sample after sample preparation or both. Examples of analytes of interest are vitamin D, drugs of abuse, therapeutic drugs, hormones, and metabolites in general. The list is however not exhaustive.

In particular, the analyzer can comprise a sample preparation station for the automated preparation of samples. A "sample preparation station" is a pre-analytical module coupled to one or more analytical apparatuses or a unit in an analytical apparatus designed to execute a series of sample processing steps aimed at removing or at least reducing interfering matrix components in a sample and/or enriching analytes of interest in a sample. Such processing steps may include any one or more of the following processing operations carried out on a sample or a plurality of samples, sequentially, in parallel or in a staggered manner: pipetting (aspirating and/or dispensing) fluids, pumping fluids, mixing with reagents, incubating at a certain temperature, heating or cooling, centrifuging, separating, filtering, sieving, drying, washing, resuspending, aliquoting, transferring, storing . . . .

A sample may be provided for example in sample containers such as sample tubes, including primary tubes and secondary tubes, or multi-well plates, or any other sample carrying support.

Reagents may be arranged for example in the form of containers or cassettes containing individual reagents or group of reagents and placed in appropriate receptacles or positions within a storage compartment or conveyor. Other types of reagents or system fluids may be provided in bulk containers or via a line supply.

Unless specified differently in the respective context, the terms "about" in connection with values for parameters means to include a deviation of +/−10% from the specified value in the present disclosure.

First, an overview over the detecting and/or monitoring techniques of the present disclosure will be given in connection with FIG. 1, FIG. 2a and FIG. 2b. Additional aspects of the automated determination of a degasser state will be discussed in connection with FIG. 3 and FIG. 4. Different aspects of embedding the detecting and/or monitoring technique of the present disclosure in workflows will be discussed in connection with FIG. 5 to FIG. 7. Last, in the context of FIG. 8, aspects of analyzers according to the present disclosure will be explained in more depth.

General Overview

FIG. 1 is a flow diagram illustrating the techniques for detecting and/or monitoring a state of a degasser of an analyzer according to the present disclosure.

The method includes obtaining 101 a time series of values indicative of pressures inside the container, the time series spanning a period during which the container is evacuated or pressurized and determining 103 a liquid level state of the degasser which is determined by an amount of liquid present in the container based on the time series.

These steps will be discussed in more detail below. Initially, a short explanation of the degassers which can be monitored by using the techniques of the present disclosure will be given.

Figure 2A:
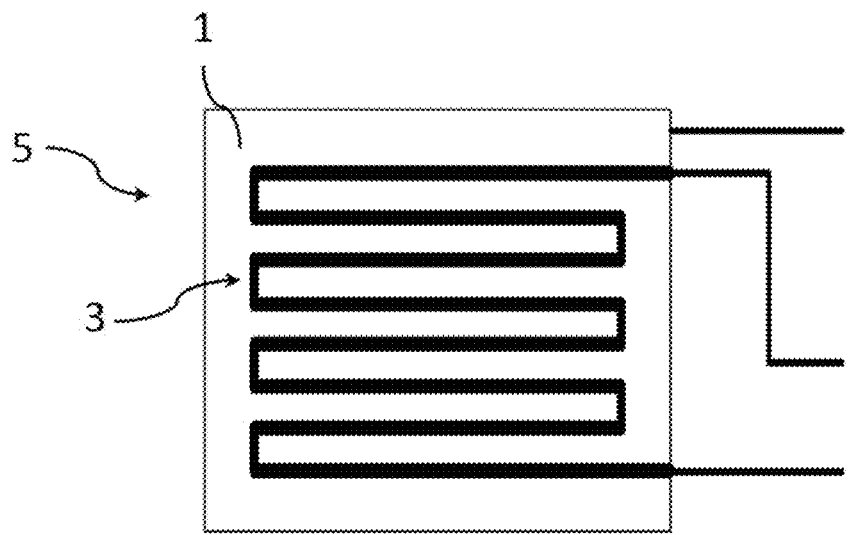
FIG. 2a and FIG. 2b illustrate a container with two different liquid level states (determined by two different amounts of liquid present in the container) according to the present disclosure.
Figure 2B:
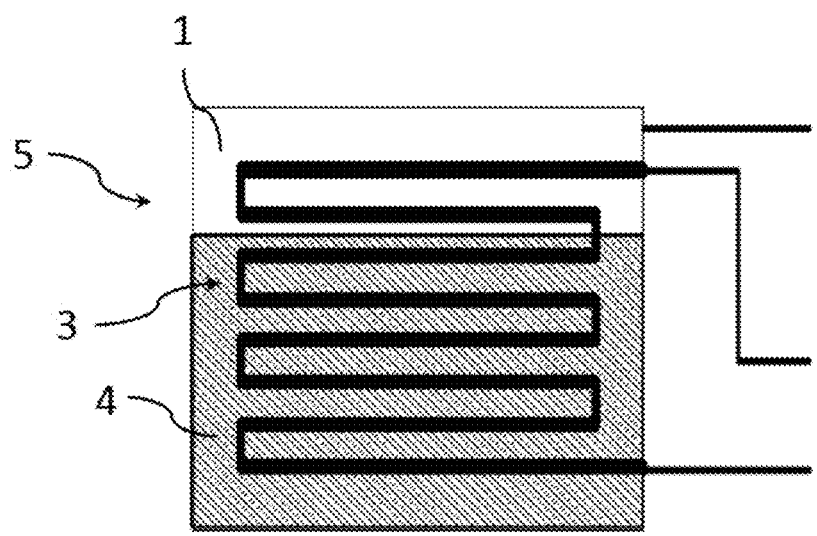

As can be seen in FIG. 2a and FIG. 2b, the degasser 5 includes a container 1 configured to be evacuated, e.g., as part of a start-up of the degasser (or during operation of the degasser). In the example of FIG. 2a and FIG. 2b, the degasser 5 includes tubing 3 which is arranged inside the container (e.g., in a wound manner to increase a surface area of the tubing inside the container 1). A liquid (e.g., water) including a gas to be removed by the degasser 5 is guided through the tubing 3. A vacuum inside the container 1 can remove undesired gas from the liquid by transferring this undesired gas from the liquid in the tubing 3 into the container 1. For instance, the tubing 3 can include semi-permeable material which lets gas molecules of the undesired gas pass but blocks water (or other liquid) molecules.

As the degasser 5 ages (or due to a defect occurring at some point in time), water or any other liquid transported inside the tubing 3 can leak into the container 1. For example, the above discussed semi-permeable material of the tubing 3 might become porous. Over time, an increasing amount of liquid can accumulate inside the container 1. FIG. 2b shows a situation where a substantive amount of liquid 4 has accumulated. This liquid accumulation can detract from the performance of the degasser 5 and eventually might lead to a degasser error or malfunction.

Now, the automated detecting and/or monitoring techniques of the present disclosure can monitor a pressure change inside the container 1 to obtain the time series of values indicative of pressures inside the container 1 (for example, while the container 1 is being evacuated during an initialization or start-up process of the analyzer including the degasser). When the amount of liquid 4 inside the container 1 is large, the pressure change characteristics are different compared to when the amount is liquid is low. Therefore, a liquid level state being determined (i.e., indicative) of the amount of liquid can be determined from the time series. All these steps happen in an automated manner.

In some examples, the technique comprises (see again FIG. 1) processing 107 the time series to estimate an amount of liquid in the container 1 and determining the liquid level state of the degasser based on the estimated amount of liquid. However, it should be pointed out that no express estimation of an amount of liquid is required when using the techniques of the present disclosure. The amount of liquid may only be determined implicitly in some situations in some examples. For instance, the time series could be compared to one or more example time series associated with different liquid level states (which in turn are determined by an amount of liquid inside the container 1).

In the subsequent sections, water will be used as an example liquid according to the present disclosure. It should be understood that the techniques of the present disclosure are not limited to any particular liquid that can be treated in a degasser of an analyzer. Therefore, the techniques discussed below can be equally applied in situations where another liquid than water is to be treated in a degasser.

Different aspects of the steps of obtaining the time series and determining the liquid level state of the degasser will be discussed next.

In general, obtaining the time series can include measuring a pressure inside the container 1 at one or more different points in time. In some examples, obtaining the time series includes measuring a pressure inside the container 1 at multiple times (e.g., 5 or more measurement points or 10 or more measurement points). In these cases, the time series describes a pressure curve inside the container.

However, in some examples it can be sufficient measure a single value indicative of a pressure inside the container. In these examples, the times series includes this single measured value and at least one additional values indicative of pressures inside the container which is not measured. For instance, it might be the case that the container is at a defined pressure at some point in time (e.g., after venting). The defined pressure values (or pressure values) can be included in the time series even though they are not directly measured.

The values indicative of pressures inside the container can be the result of direct pressure measurements of the pressure in the container or at a position in fluid communication with the container (e.g., at a pump for evacuating the container). In other examples, a values indicative of pressures inside the container can be the result of a measurement of another parameter linked to the pressure inside of the container (e.g., a measurement parameter x which is in a known functional relationship with pressure inside the container p–x=f(p)). In these examples, the other parameter linked to the pressure inside of the container can be processed to obtain the time series of values. However, in other examples the other parameter linked to the pressure inside of the container can be processed directly to determine a liquid level state as a proxy for the pressure values inside the container.

Examples of Liquid Level State Determination

Figure 3:
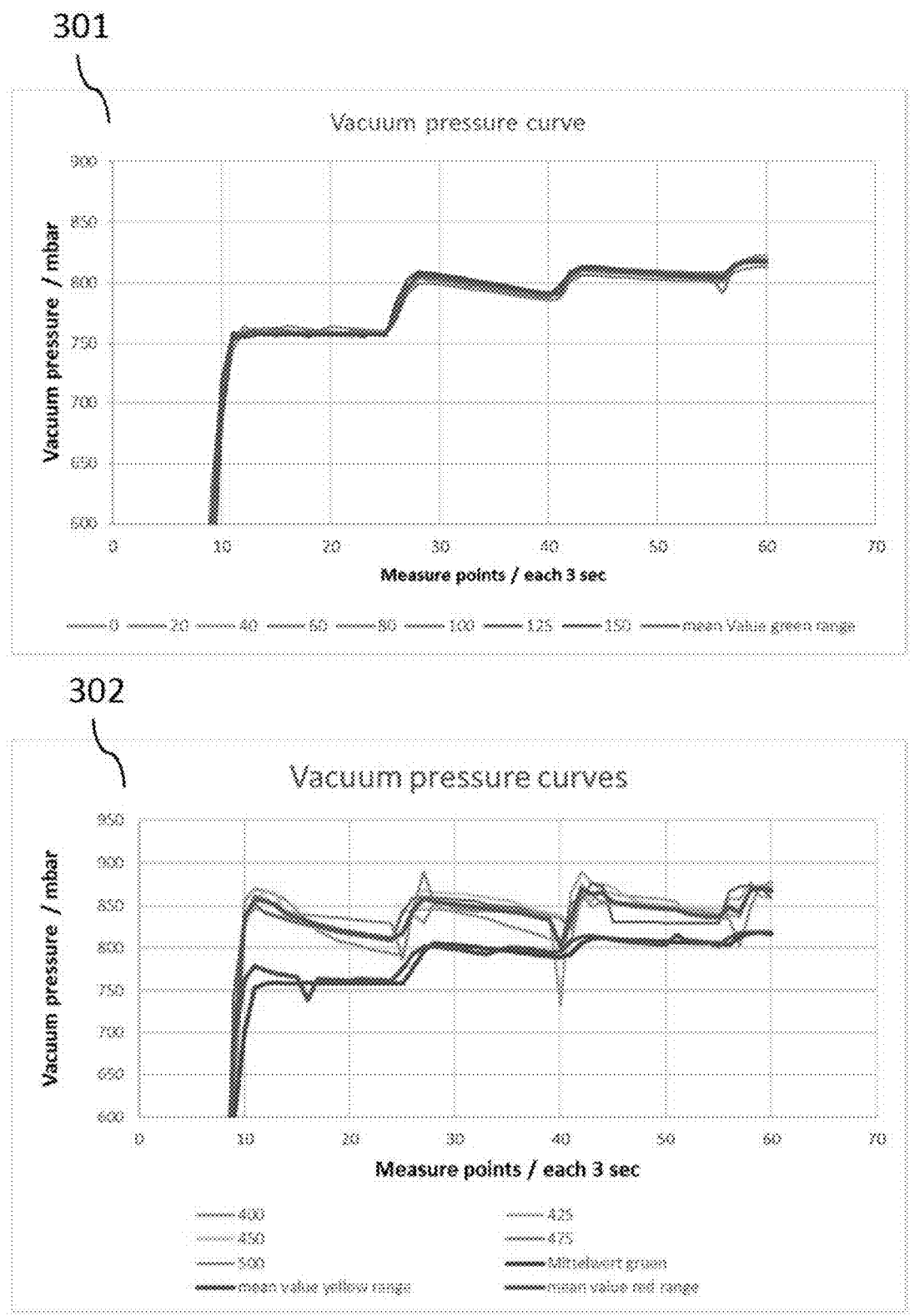
FIG. 3 illustrates example time series of values indicative of pressures inside a container.

FIG. 3 shows two set of graphs showing example time series according to the present disclosure. In this example, a pressure value is measured in the container every three seconds. Other inter-measurement timings are possible in other examples. The upper set of curves 301 show different curves for lower amounts of water present in the container (between 0 mL and 150 mL in the present example). The lower set of curves 302 show different curves for lower amounts of water present in the container (between 400 mL and 500 mL in the present example). In all examples, the container is evacuated using the same set of parameters for the evacuation procedure (e.g., pump speeds, timings, etc.). As can be seen in FIG. 3, the shape of the curves for different amounts of water present in the container changes. The automated techniques of the present disclosure can evaluate this change and determine a liquid (water) level state of the degasser.

Further aspects of this determination process will be discussed next.

In some examples, determining the liquid level state of the degasser based on the time series includes using a model of a pressurization or evacuation process of the container. In some examples, the model can be parameterized by an amount of liquid present in the container. In addition or alternatively, the step of determining the liquid level state of the degasser based on the time series can include analyzing a shape of the time series.

Figure 4:
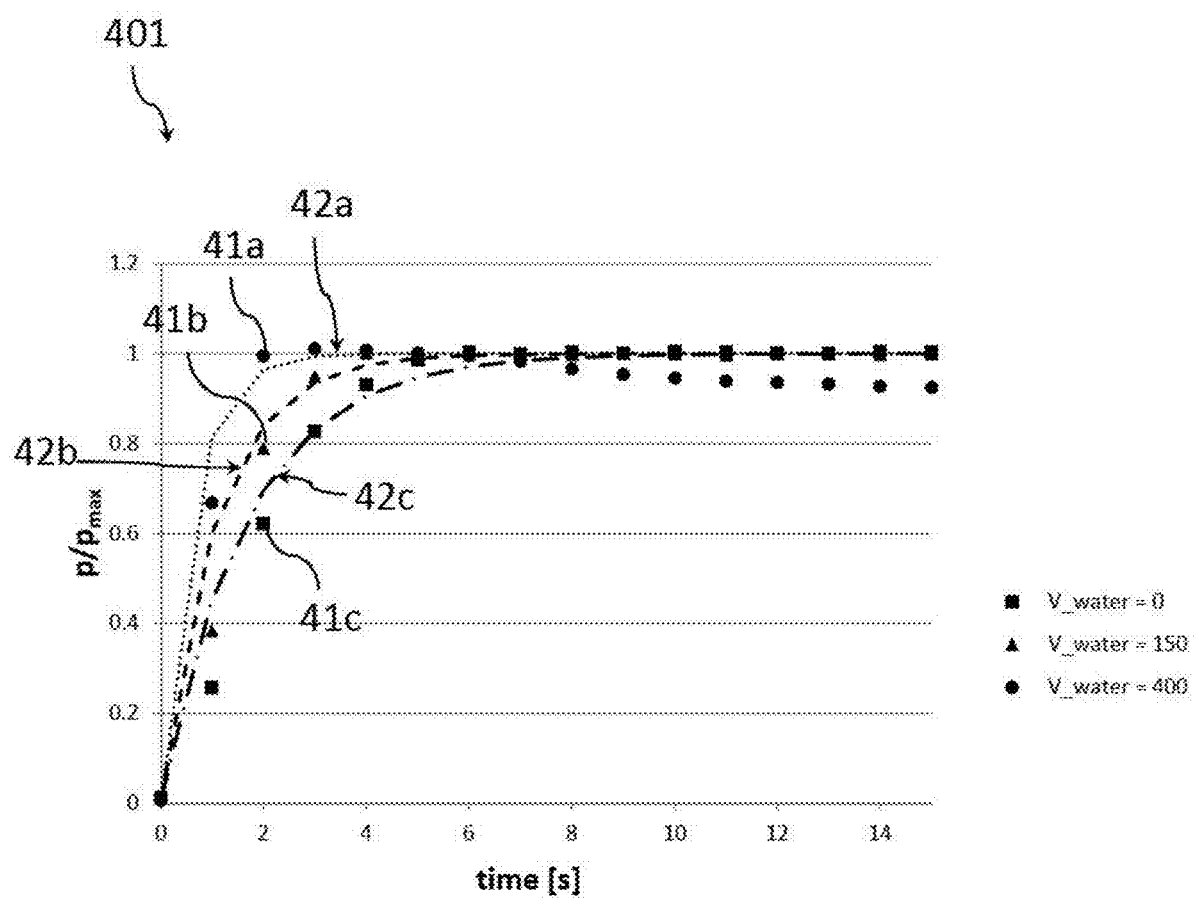
FIG. 4 illustrates the determination of a liquid level state based on a time series according to the present disclosure.

An example is shown in FIG. 4. The dots in the graph 401 indicate three different times series 41a-c of measured pressure values inside the container of a degasser. The time series are measured while the container contains three different amounts of water (e.g., 0 mL, 150 mL and 450 mL). In the graph of FIG. 4, the measured pressure values are normalized (by division through a maximum vacuum pressure $p_{max}$). In general, the measured pressure values (or other measured or inferred values being included in the time series) can be processed in any suitable way before being used for the determination procedure in the techniques of the present disclosure.

Graph 401 also shows three theoretical pressure curves 42a-42c (in dotted lines) for the respective amounts of water (water level states) in the container determined by using a model of the pressurization or evacuation process of the container. It can be seen that the measured time series match the theoretical curves relatively well. In other words, by fitting the model on the measured time series, an amount of water present inside the container can be estimated.

In the example of FIG. 4, the inside of the container is modeled as a free volume filled by an ideal gas and an unknown amount of water. The model can use a free volume of the container (or a volume filled by water) as a free parameter. The pressure rises more sharply upon evacuating the container with a predetermined set of parameters for the evacuation procedure (e.g., pump speeds, timings, etc.) when more water is present compared to situation when less water is present. The free volume is lower in the first case which means that a lower pressure is obtained quicker when using the same set of parameters for the evacuation procedure. The techniques of the present disclosure can determine a water level state of the degasser based on this sharper or slower rise of pressure inside the container during the evacuation procedure.

In one example, a model of the pressure inside the container can yield the following relationship:

$$p_0 - p_T = p_0 - p_0 e^{-\frac{q}{V_T}*t}.$$ (equation 1)

In this equation, $p_0$ denotes an initial pressure inside the container at time zero, $p_T$ is the time dependent pressure, $V_T$ denotes the free volume in the container and q is a volume flow rate of a pump connected to the container for evacuating the container. In this example, the volume flow rate of the pump is known (either measured or inferred based on a set of pump parameters). Now, the initial pressure $p_0$ and one or more values for the time dependent pressure $p_T$ are obtained as a time series (as discussed above). Based on these input parameters, the free volume $V_T$ and thus the amount of water inside the container (corresponding to an amount of water filling a volume corresponding to overall volume inside the container minus the calculated free volume) can be calculated.

Equation 1 is only one example for calculating the free volume inside a container according to the present disclosure. Other models of the evacuation (or pressurization) process of the container can yield to other dependencies of the free volume and the pressure inside the container.

Moreover, other known parameters (or free parameters) than the known parameters (volume flow rate of a pump q) shown in equation 1 can be taken into account in some examples (e.g., ambient pressure or ambient temperature). In addition, the concrete form of the equation might be different even when using the same model. For example, an alternative formulation can use the volume of the water inside the container as free parameter instead of the free volume $V_T$.

As discussed above, a single measured pressure value can be sufficient in some examples to determine the liquid level state of the degasser. In these examples, an initial pressure value (or a final pressure value) can be known. For instance, the container can be vented and brought to an ambient pressure level (or to another defined pressure level). This ambient pressure level (or other defined pressure level) can be known or inferred from other measurements. For instance, an ambient pressure level can be set for a particular analyzer (e.g., depending on an altitude of the analyzer). Then, the time series of the present disclosure can consist of one or more defined pressure levels at certain times and one measured pressure level. It can be seen that equation 1 can be solved to obtain a free volume $V_T$ inside the container based on this information.

The evaluation of the times series to determine the liquid level state can happen in many different ways.

As shown above, an equation (e.g., derived based on a model of the pressure inside the container for different liquid level states) could be solved using the values times series indicative of pressure values inside the container (e.g., including known, inferred and/or measured pressure values).

In addition or alternatively, determining the liquid level state of the degasser can include performing a curve fitting operation on the time series. One or more equations obtained from modelling the pressure inside the container during evacuation or pressurization can be fitted on the time series. Any suitable numerical technique can be used to carry out this curve fitting operation. For example, a numerical regression technique can be used determine a free parameter of the one or more equations. In some examples, a free volume or volume of water inside the container can be determined by a numerical technique using a model of how the pressure inside the container behaves for different amounts of liquid present inside the container.

The time series can be pre-processed before being used in the liquid level state determination process. For instance, the time series can undergo one or more of a smoothening or averaging operation, an outlier removal operation and a preparatory curve fitting operation.

In some examples, the automated technique can compare the time series of pressure values to two or more reference time series to determine the liquid level state. For instance, a number of reference time series for a set of water level states (e.g., 50 mL increments) can be used to determine a most similar reference time series for an obtained time series.

In addition or alternatively, a numerical classifier can be used to classify the time series into two or more liquid level states (e.g., two or more states each corresponding to a predetermined range of amounts of water inside the container, as will be discussed in more detail below). In some examples, a machine learning technique can be employed to train a classifier to classify the obtained time series into one of multiple classes corresponding to liquid level states.

In addition or alternatively, determining the liquid level state of the degasser based on the time series can include evaluating one or more of a pressure level at a predetermined time, a magnitude of a pressure drop, a magnitude of a pressure rise, a speed of a pressure drop and a speed of a pressure rise. For example, a magnitude of a pressure drop after starting an evacuation of the container can be sufficient to infer a free volume (or a volume of water inside the container). Again, it can be seen from equation 1 that knowing a $\Delta p$ (e.g., $p_0-p_T$) can suffice to calculate $V_T$.

In the preceding section a time series indicative of pressure values spans an evacuation process of the container (or part of an evacuation process). In other examples, a time series can span a pressurization process of a container (or part of it). For instance, it can be seen that a model as discussed above can also be used to determine a free volume inside the container in a situation where a volume flow into the container (e.g., during a pressurization process) is known or measured. The techniques discussed above can be equally applied during a pressurization process (e.g., during a venting process in which a vacuum inside the container is released).

In still further examples, the time series can span periods of pressurization and periods of evacuation of the container. The techniques of the present disclosure are not limited to a particular process. It is understood that, e.g., based on a model modelling a free volume or water volume inside the container, any time series of pressure values can be processed to determine free volume or water volume inside the container. However, an evacuation process (e.g., during initialization of the degasser) can be particularly convenient in some examples.

In general, a pressure difference of an evacuation or a pressurization process during which the time series is obtained can at least 100 mBar.

In some examples, the determination of the liquid level state takes into account one or more parameters regarding the ambient environment of the analyzer including the degasser whose state is be detected and/or monitored.

For instance, analyzers might be located at different altitudes. This might mean that the ambient pressure of the analyzer and the degasser is markedly different for two analyzers deployed at different locations (e.g., between a first analyzer located at sea level and a second analyzer located at 3000 m above sea level). Therefore, the determination of the liquid level state of the degasser might take into account an altitude of the analyzer. For instance, a stored ambient pressure or altitude of the analyzer can be used. In other examples, an ambient pressure can be measured or inferred as part of the techniques of the present disclosure. In addition or alternatively, a model can be parameterized by an altitude or ambient pressure of the analyzer including the degasser.

In the preceding sections aspects of the automated liquid level state determination have been discussed in some detail. In the subsequent section, additional details regarding how the automated techniques of the present disclosure can be embedded in an analyzer workflow will be discussed.

Analyzer Workflow Including Techniques of the Present Disclosure

In general, the techniques of the present disclosure can be employed whenever time series of values indicative of pressures inside a container of a degasser are available.

In some examples, the steps of obtaining a time series and determining a liquid level state are automatically performed in regular intervals. In addition or alternatively, the steps of obtaining a time series and determining a liquid level state can happen in reaction to predetermined trigger events.

For instance, the steps of obtaining a time series and determining a liquid level state can be automatically performed during start-up or during a check-up procedure of the degasser or an analyzer or module of an analyzer including the degasser.

In addition or alternatively, the steps of obtaining a time series and determining a liquid level state can be automatically performed in predetermined regular intervals (e.g., once per day or once per week).

In addition or alternatively, the steps of obtaining a time series and determining a liquid level state can be automatically performed in reaction to predetermined error states of the degasser or analyzer or in reaction to predetermined degasser or analyzer parameters (e.g., a parameter monitored by the analyzer assuming a particular value). For instance, it can be possible to detect a certain amount of gas in the liquid treated by the degasser which can trigger the steps of obtaining a time series and determining a liquid level state according to the present disclosure.

In other examples, the steps of obtaining a time series and determining a liquid level state are automatically performed continuously during the operation of the degasser.

In some examples, the workflow of the degasser includes an evacuation procedure at a predetermined point in time (or multiple evacuation procedures at multiple points in time). As discussed above, these evacuation procedures can be suitable for performing the techniques of the present disclosure as a state of the degasser can be better-defined in these situations than in other situations.

As discussed above, determining a liquid level state of the degasser can include determining whether the degasser is in one of two or more discrete states. Each state can be associated with a range of amounts of water present in the container (i.e., ranging from a lower boundary of the amount of water to an upper boundary of the amount of water). For instance, the discrete states can include two or more of a normal state in which a liquid level is tolerable and at least one critical state in which the liquid level is approaching a critical level.

Figure 5:
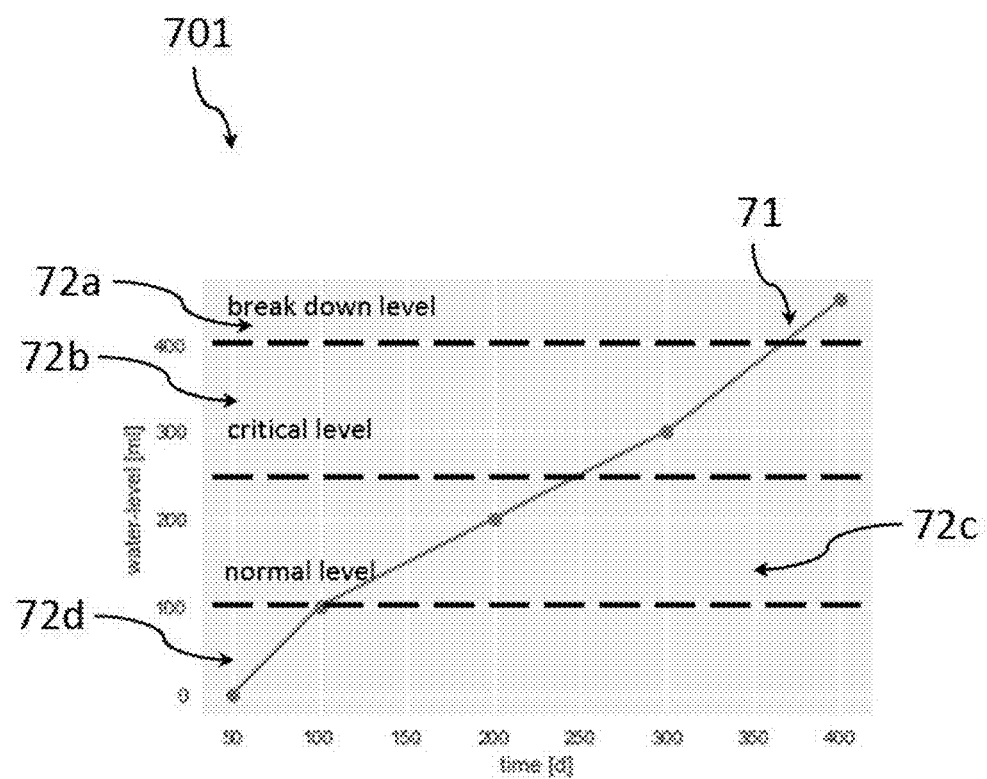
FIG. 5 illustrates a degasser state prediction technique using multiple classes according to the present disclosure.

FIG. 5 illustrates an example in which four discrete liquid level states 72*a-d* are defined for a particular container of a degasser. In this example, a normal state 72*d* refers to no water or a small amount of water being present in the container (e.g., between 0 mL and 100 mL). A sub-critical state 72*c* refers to a higher amount of water present in the container (e.g., between 100 mL and 200 mL). These amounts might still mean that the degasser operates within specification (and thus are acceptable). A critical state 72*b* refers to a still higher amount of water (e.g., between 200 mL and 300 mL). These amounts of water might impair the operation of the degasser so that a maintenance operation is warranted. An even higher amount of water inside the container (e.g., above 300 mL) might correspond to a break-down state in which an immediate breakdown of the degasser must be expected. It will be discussed below that the analyzer can be configured to trigger corresponding reactions if the degasser is found to be in one of these states.

It should be understood that the states in FIG. 5 are only exemplary. In other examples, the technique of the present disclosure can determine a higher number (e.g., five or more or six or more) of different liquid level states of the degasser. In addition, each liquid level state can be associated with an arbitrarily selected range of amounts of liquid present inside the container. For instance, the ranges corresponding to different states can be of different size. In addition or alternatively, the liquid level states can be associated with different states of the degasser in other examples.

In other examples, a liquid level state might refer to a particular amount of liquid present inside the container. As discussed above, an amount of liquid inside the container (or free volume inside the container) can be automatically determined using the techniques of the present disclosure. In these examples, the liquid level states can form a continuum of states each corresponding to a particular amount of liquid.

The techniques of the present disclosure can include triggering a response in reaction to the determined liquid level state of the analyzer. Aspects of these responses will be discussed next.

In some examples, the liquid level state of the degasser is one of multipole discrete states which can require different types of responses. The required response can be automatically triggered in some examples. In some examples, the response can include a particular intervention.

For instance, the response can include one or more of the list consisting of logging the time series of values, outputting an information regarding the liquid level state on a user interface of the automated analyzer, outputting a warning, triggering a service or maintenance operation, scheduling a service or maintenance operation, and stopping operation of the degasser and/or the automated analyzer.

In addition or alternatively, a response can include increasing a frequency of the detection techniques of the present disclosure. For instance, when a degasser enters a sub-critical state, a frequency of detecting the degasser state can be increased compared to a frequency while the degasser is in a normal state.

In addition or alternatively, the response can include automatically informing one or more of different receivers regarding the liquid level state of the degasser. For instance, a message can be displayed on a graphical user interface of the analyzer. In other examples, a message can be sent to service personnel of the analyzer (e.g., at a remote location). The service personnel can be provided by a vendor or service provider for the analyzer including the degasser.

For instance, a first discrete liquid level state 72d can be associated with an amount of liquid ranging from zero to a particular first threshold amount. An automated response to determining that the degasser is in this liquid level state can include logging the time series of values and/or outputting an information regarding the liquid level state on a user interface of the automated analyzer. For instance, a determined amount of liquid inside the container can be output on a (graphical) user interface and/or a symbolic representation of a liquid level state can be displayed (e.g., "within specification" or a green traffic light symbol). Otherwise, operation of the degasser can be resumed. The first liquid level state can be a normal liquid level state in some examples.

In addition or alternatively, a second discrete liquid level state 72c can be associated with an amount of liquid ranging from the first threshold amount to a second threshold amount higher than the first threshold. An automated response to determining that the degasser is in this liquid level state can include logging the time series of values and/or outputting a warning regarding the liquid level state on a user interface of the automated analyzer. Moreover, a preventive maintenance operation can be triggered if the determination step yields that the degasser is in this second state (as will be discussed in more detail below). In other examples, an immediate maintenance operation can be triggered. The maintenance operations in the present disclosure can be carried out automatically in some examples (e.g., by triggering a predetermined maintenance routine of the analyzer). In other examples, the maintenance operation can be carried out by an operator or service personnel. In these cases, triggering a maintenance operation might include instructing the operator or service personnel to carry out the maintenance operation (e.g., by displaying a corresponding message on a user interface of the analyzer such as "remove water from degasser" or "check degasser"). The instructing operation can include providing the operator with instructions how to carry out the maintenance operation. In some examples, the analyzer can resume using the degasser if the degasser is found to be in the second liquid level state.

In addition or alternatively, a third discrete liquid level state 72b can be associated with an amount of liquid ranging from the second threshold amount to a third threshold amount higher than the second threshold. An automated response in this case can include outputting a warning and/or triggering or scheduling a service or maintenance operation. In some examples, operation of the degasser can be halted unless the maintenance operation is carried out within a particular period of time after the degasser has been found in to be in the third liquid level state. The third liquid level state can be a critical liquid level state in some examples.

In addition or alternatively, a fourth discrete liquid level state 72a can be associated with an amount of liquid exceeding the third threshold amount. An automated response in this case can include immediately stopping the operation of the analyzer or the degasser. In addition or alternatively, an automated response can be triggering a service or maintenance operation. Operation might only be resumed after the service or maintenance operation has been completed.

In other examples, the response might be limited to informing an operator regarding the liquid level state of the analyzer. For example, the response might include outputting an information regarding the liquid level state on a user interface of the automated analyzer. In addition or alternatively, the response might include outputting a warning if the amount of liquid exceeds one of one or more predetermined thresholds. As discussed above, the determination step might yield an amount of liquid inside the container. In some examples, this amount of liquid is output on a graphical user interface of the analyzer. In addition or alternatively, a liquid level state indicator (e.g., color-coded) can be output on a graphical user interface of the analyzer.

As discussed above, the techniques of the present disclosure can allow predicting a critical degasser state based on multiple determinations of a liquid level state. In these cases, a response might include scheduling a service or maintenance operation prior to the degasser progressing to a critical degasser state or a break-down state as discussed above. For example, a service or maintenance operation might involve external service personnel (e.g., having a required training to carry out the service or maintenance operation) and/or spare parts which might not be present on premise. In these cases, the prediction based on multiple liquid level state determinations can allow to reserve sufficient time for these time consuming tasks to avoid a prolonged down time of the analyzer or degasser (which might be the consequence of detecting a critical degasser state shortly before or after a degasser breakdown). In addition or alternatively, being able to predict a time of a critical degasser state can allow scheduling service or maintenance operations on demand. If a time of a predicted time of a critical degasser state is still far enough in the future, the degasser can resume its normal operation without being interrupted by service or maintenance operations.

FIG. 5 illustrates a degasser state prediction according to the present disclosure.

As can be seen, a liquid level state of the degasser is determined repeatedly over a predetermined period of time (roughly one year in the example of FIG. 5). As can be seen, an amount of liquid inside the container steadily increases in the predetermined period of time (as discussed above, the liquid level state of the degasser can be in multiple discrete classes in the period of time). Now, based on multiple determinations of a liquid level state a future development of the liquid level in the container and particularly a critical state of the degasser can be predicted.

For instance, an extrapolation technique can be used to predict a future liquid level state based on the multiple determinations of the liquid level state. For example, a particular linear or non-linear development of the amount of liquid inside the container can be assumed and a future amount of liquid can be determined by extrapolating data obtained from the multiple determinations of the liquid level state.

In the example of FIG. 5, an extrapolation based on the determinations up to, e.g., day 200 might yield that a critical state can be expected around day 250. Based on this information appropriate responses can be triggered. For example, a service or maintenance operation can be scheduled around day 220 to make sure that the degasser does not enter a critical state (while maximizing an interval between subsequent maintenance operations).

The future development of the liquid level state can be predicted continuously or upon particular trigger event (e.g., a particular minimum surge of an amount of liquid inside the container). In addition or alternatively, the prediction can include taking into account all determinations of the liquid level state after a previous service of maintenance operation or only a subset of determinations.

Concrete Examples of Analyzer Workflows

In some examples, obtaining the time series of the present disclosure can include opening a valve to compensate a vacuum in the container, closing the valve, switching on a vacuum pump to evacuate the container and measuring the values in the times series while the container is evacuated. The switching of the valves can improve security and reliability of the process in some examples (e.g., to "initialize" the pressure inside the container to a predetermined pressure value). However, in other examples no particular "initialization" might be required or desired. Thus, the switching of the valves to compensate a vacuum inside the container can be omitted. The techniques of the present disclosure can still be carried out without these initial steps. For instance, the techniques of the present disclosure can still be carried out in case a residual vacuum is present in the container (e.g., after the container has been idle for some period of time). In other examples, the techniques of the present disclosure can be carried out starting from another unknown pressure state of the container.

As discussed above, the time series can also be measured during pressurization operations of the container.

Figure 6:
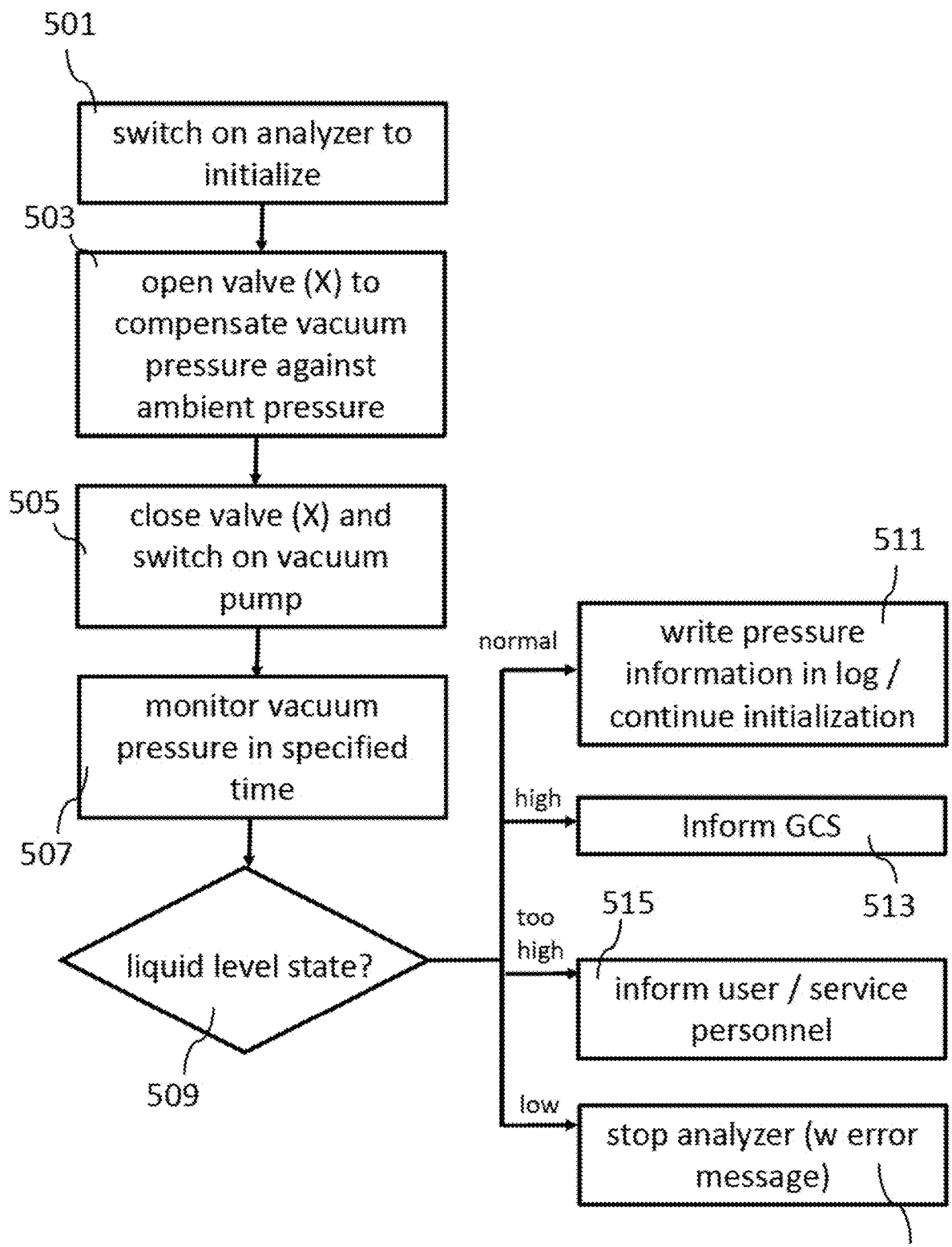
FIG. 6 and FIG. 7 are flows diagrams illustrating example methods according to the present disclosure.
Figure 7:
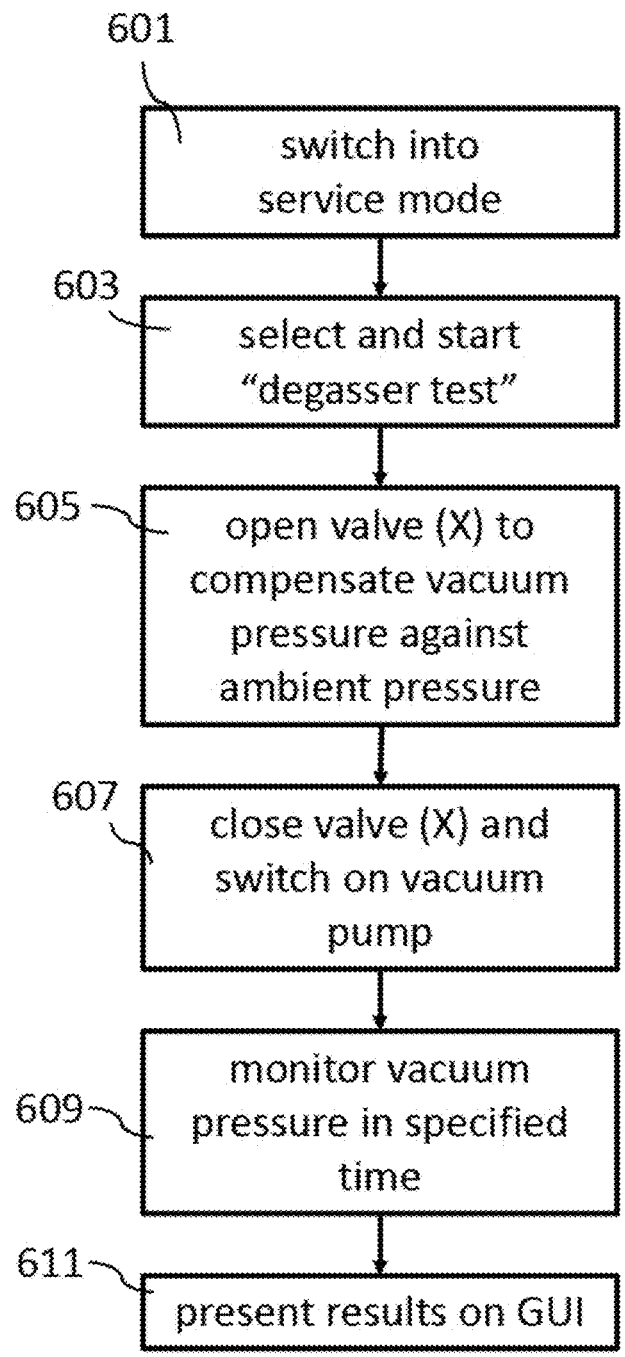

FIG. 6 and FIG. 7 are flows diagrams illustrating example methods according to the present disclosure.

FIG. 6 shows an example automated procedure which can be carried out during an initialization process of an analyzer including the degasser (e.g., carried out each morning when the analyzer is turned on).

The process starts with switching on 501 the analyzer which triggers the automated initialization process. In a further step, a valve in a fluid channel connecting the inside of the container to an ambient environment is opened 503. As a result, a pressure inside of the container of the degasser is set to an ambient pressure (i.e., a remaining vacuum inside the container is compensated). In some examples, a pressure inside the container might be not exactly known or predictable (e.g., as a development of the pressure during the off time of the analyzer is not exactly predictable). Thus, bringing the pressure to an ambient pressure can establish a defined pressure value inside the container. As discussed above, this defined pressure value can differ depending on factors such as an altitude of the analyzer.

The valve is closed and a vacuum pump is switched on 507 in a subsequent step. The container of the degasser is evacuated as a result. During this evacuation process, a pressure inside the container is monitored 507 to obtain the time series of values indicative of the pressure inside the container.

Based on this obtained time series, a liquid level state is determined 509 as discussed in the present disclosure. In the example of FIG. 6, four discrete classes of liquid level states are foreseen, each class corresponding to a particular amount of water inside the container (i.e., a "low" class, a "normal" class, a "high" class, and a "too high" class).

As also shown in FIG. 6, automatic responses are defined for each of the discrete classes of liquid level states. If the degasser is found to be in the low class, operation if the analyzer can be stopped 517. In addition, an error message can be output on a graphical user interface of the analyzer. If the degasser is found to be in the normal class, information regarding the pressure is logged and the initialization process is resumed 511. If the degasser is found to be in the high class, a customer service (e.g., service personnel) is informed 513. For instance, a message can be sent to the customer service (e.g., service personnel). Moreover, the initialization process can resume. Last, if the degasser is found to be in the too high class, a user or service personnel can be informed 515 to intervene directly.

As discussed above, different or additional responses can be triggered in other examples.

FIG. 7 illustrates a second workflow according to the present disclosure. This workflow is carried out during a service operation of the analyzer or the degasser.

Initially, the analyzer is switched into a service mode 601. The service personnel subsequently selects a "degasser test" 603. Subsequently, a time series of pressure values is automatically monitored during an evacuation process 605-609 in the same way as in the example of FIG. 6 discussed above (i.e., steps 605-609 in FIG. 7 correspond to steps 503-507 in FIG. 6).

However, the liquid level state determination includes presenting the time series or information derived from the time series on a graphical user interface of the analyzer 611. In this example, a more experienced user or service personnel can interpret the results and initiate appropriate responses. In contrast to that, the workflow of FIG. 6 includes a higher degree of automated processing of the liquid level state determination results which factors in that in day to day operation of the analyzer a level of expertise of operators might be insufficient to interpret the liquid level state determination results.

Aspects of Analyzers

In some examples, the analyzer including the degasser of the present disclosure also includes a mass spectrometer. In addition or alternatively, the degasser can be employed in a water supply system of the analyzer.

For example, the water (or different liquid) can be used in a sample preparation process of an analyzer (optionally including a mass spectrometer). This can include diluting samples prior to scrutinizing the samples in a mass spectrometer process.

Figure 8:
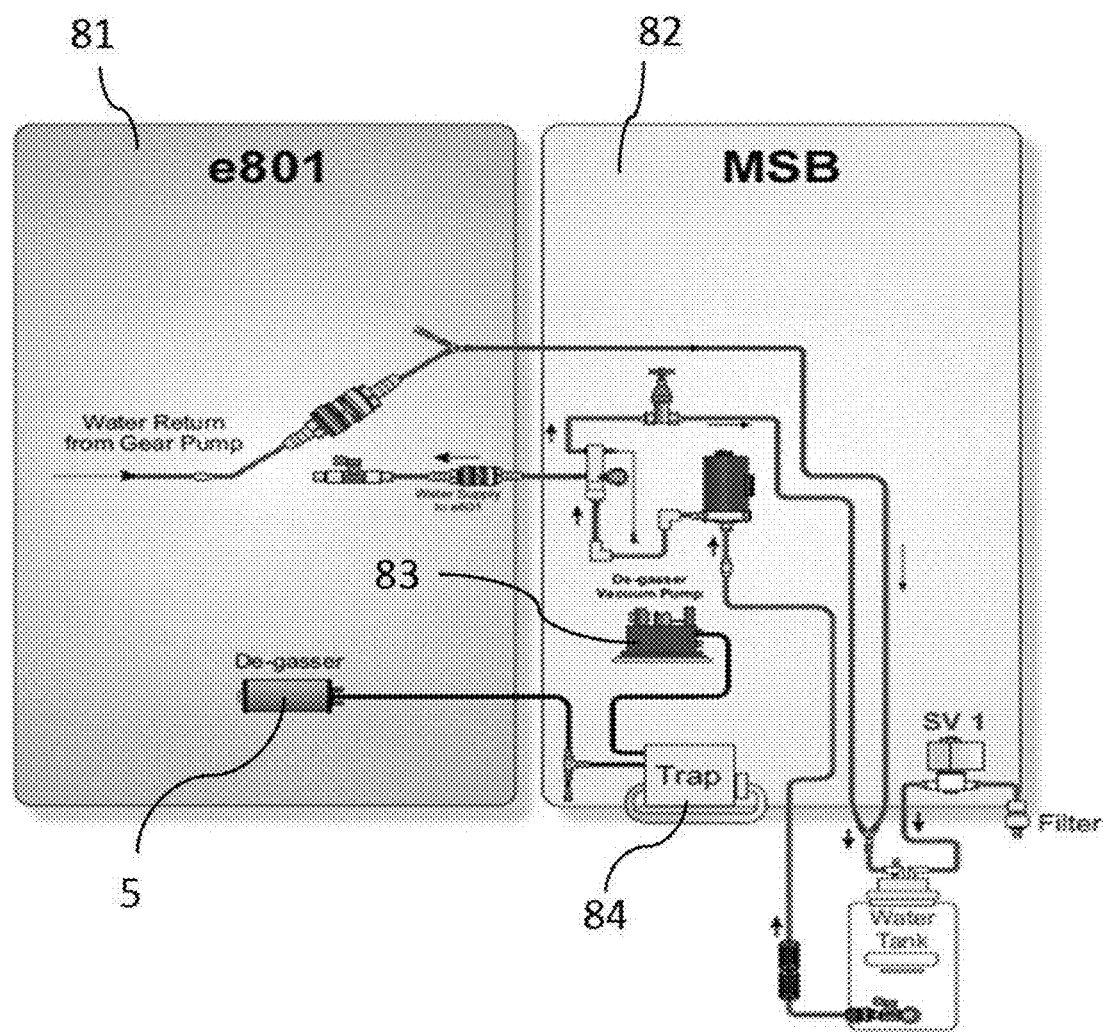
FIG. 8 is a schematic drawing of an analyzer according to the present disclosure.

FIG. 8 is a schematic drawing of an analyzer according to the present disclosure.

A degasser 5 is arranged in a first module 81 of the analyzer. This first module 81 can be a sample preparation module in some examples. For instance, water or another liquid can be used in this sample preparation module for sample preparation. In some examples, the sample preparation module can include a pipetting device. Other components which can be include in the sample preparation module are described above. The degasser 5 can be arranged to remove gas from the water or another liquid used in this process. A pump 83 connected to the degasser 5 is arranged in a second module 82 (which is a sample buffering module "MSB" for buffering samples in the example of FIG. 8).

In general, the degasser monitored using the techniques of the present disclosure can be arranged anywhere in an analyzer or a module including an analyzer. Example analyzers or modules of analyzers are discussed in the summary section above.

Computer-Implementation

The present disclosure also relates to a computer system being configured to carry out the techniques of detecting and/or monitoring a state of a degasser of an analyzer.

In some examples, the computer system can be a controller of the analyzer (or part thereof). However, in other examples, the computer system can be only connected to the analyzer through a network and not be part of the controller of the analyzer. For instance, the computer system can be a hospital or laboratory management system, or a computer system of a vendor or service provider of the analyzers.

It is merely required that the computer system obtains the time series of values indicative of pressures inside the container of the degasser. This can mean that the computing system receives this information over a network. However, in other examples, as discussed above, the computing system also controls functions of the analyzer (e.g., measuring pressures or triggering responses) which means that it the controller of the analyzer.

The computing systems of the present disclosure are not limited to a particular software or hardware configuration. As long as a software or hardware configuration is capable of carrying out the steps of the techniques for detecting and/or monitoring a state of a degasser of an analyzer according to the present disclosure the computing system can have this software or hardware configuration.

The present disclosure also relates to a computer-readable medium having instructions stored thereon which when carried out by a computer system prompt the computer system to carry out the steps of the techniques for detecting and/or monitoring a state of a degasser of an analyzer according to the present disclosure.

Further disclosed and proposed is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of method steps as disclosed herein may be performed by using a computer or a computer network, preferably by using a computer program.

Further disclosed and proposed is a computer program product having program code, in order to perform the method according to the present disclosure in one or more of the embodiments enclosed herein when the program is executed on a computer or computer network. Specifically, the program code may be stored on a computer-readable data carrier.

Further disclosed and proposed is a data carrier having a data structure stored thereon, which, after loading into a computer or computer network, such as into a working memory or main memory of the computer or computer network, may execute the method according to one or more of the embodiments disclosed herein.

Further disclosed and proposed is a computer program product with program code stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed is a modulated data signal which contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing measurements.

Further disclosed and proposed is a computer, or computer network, comprising at least one processor, wherein the processor is adapted to perform the method according to one of the embodiments described in this description.

Further disclosed and proposed is a computer loadable data structure that is adapted to perform the method according to one of the embodiments described in this description while the data structure is being executed on a computer.

Further disclosed and proposed is a storage medium, wherein a data structure is stored on the storage medium and wherein the data structure is adapted to perform the method according to one of the embodiments described in this description after having been loaded into a main and/or working storage of a computer or of a computer network.

Further Aspects

A number of aspects of the techniques for detecting and/or monitoring a state of a degasser of an analyzer of the present disclosure have been discussed in the preceding sections. In addition, the techniques for detecting and/or monitoring a state of a degasser of an analyzer of the present disclosure can also be carried out according to the following aspects:

Aspect 1. An automated method for detecting and/or monitoring a state of a degasser of an analyzer, wherein the degasser includes a container configured to be evacuated, the method comprising:

obtaining a time series of values indicative of pressures inside the container, wherein the time series spans a period during which the container is evacuated or pressurized; and determining a liquid level state of the degasser which is determined by an amount of liquid present in the container based on the time series.

Aspect 2. The method of aspect 1, further comprising: processing the time series to estimate an amount of liquid in the container; and determining the liquid level state of the degasser based on the estimated amount of liquid.

Aspect 3. The method of any one of aspects 1 to 2, wherein determining the liquid level state of the degasser based on the time series includes using a model of a pressurization or evacuation process of the container parameterized by an amount of liquid present in the container.

Aspect 4. The method of aspect 3, wherein the model uses a free volume of the container as a free parameter.

Aspect 5. The method of any one of aspects 1 to 4, wherein determining the liquid level state of the degasser based on the time series includes analyzing a shape of the time series.

Aspect 6. The method of any one of aspects 1 to 5, wherein determining the liquid level state of the degasser based on the time series includes evaluating one or more of:
a pressure level at a predetermined time;
a magnitude of a pressure drop;
a magnitude of a pressure rise;
a speed of a pressure drop; and
a speed of a pressure rise.

Aspect 7. The method of any one of aspects 1 to 6, wherein a pressure difference of the evacuation or pressurization process is at least 100 mBar.

Aspect 8. The method of any one of aspects 1 to 7, wherein the steps of obtaining a time series and determining a liquid level state are automatically performed in regular intervals and/or in reaction to predetermined trigger events.

Aspect 9. The method of aspect 8, wherein the steps of obtaining a time series and determining a liquid level state are automatically performed during start-up or in a check-up procedure.

Aspect 10. The method of any one of aspects 1 to 9, wherein determining a liquid level state of the degasser includes determining whether the degasser is in one of two or more discrete states.

Aspect 11. The method of aspect 10, wherein the discrete states including two or more of a normal state in which a liquid level is tolerable and at least one critical state in which the liquid level is approaching a critical level.

Aspect 12. The method of aspect 11, wherein the discrete states include multiple critical states which require different types of interventions.

Aspect 13. The method of aspect 12, further comprising automatically triggering the required intervention.

Aspect 14. The method of any one of aspects 10 to 13, wherein each discrete state corresponds to a particular range of liquid levels in the container.

Aspect 15. The method of any one of the preceding aspects, further comprising:
depending on the determined liquid level state of the degasser, automatically triggering a response of the automated analyzer.

Aspect 16. The method of aspect 15, wherein the response includes one or more of:
logging the time series of values,
outputting an information regarding the liquid level state on a user interface of the automated analyzer,
outputting a warning,
triggering a service or maintenance operation,
scheduling a service or maintenance operation, and
stopping operation of the degasser and/or the automated analyzer.

Aspect 17. The method of anyone of the preceding aspects, further comprising automatically informing one or more of different receivers regarding the liquid level state of the degasser.

Aspect 18. The method of any one of the preceding aspects, further comprising:
predicting a critical degasser state based on multiple determinations of a liquid level state.

Aspect 19. The method of aspect 18, further comprising scheduling a service or maintenance operation prior to the critical degasser state.

Aspect 20. The method of aspect 18 or 19, wherein predicting a critical degasser state based on multiple determinations of a liquid level state includes extrapolating the liquid level state based on the multiple determinations to predict a future development of the liquid level in the container.

Aspect 21. The method of any one of the preceding aspects 1 to 20, wherein obtaining a time series includes:
opening a valve to compensate vacuum in the container;
closing the valve;
switching on a vacuum pump to evacuate the container; and
measuring the values in the times series while the container is evacuated.

Aspect 22. The method of any one of preceding aspects 1 to 21, wherein the analyzer includes a mass spectrometer.

Aspect 23. The method of any one of the preceding aspects 1 to 22, wherein the degasser includes tubing comprising a semi-permeable material.

Aspect 24. The method of any one of the preceding aspects 1 to 23, wherein the degasser is employed in a water supply system of the analyzer.

Aspect 25. A computer system being configured to carry out the steps of the methods of any one of aspects 1 to 24.

Aspect 26. The computer system of aspect 25 being a controller of an analyzer.

Aspect 27. A computer-readable medium having instructions stored thereon which when carried out by a computer system prompt the computer system to carry out the steps of any one of aspects 1 to 24.

What is claimed is:

1. An automated method for detecting and/or monitoring a state of a degasser of an analyzer, wherein the degasser includes a container configured to be evacuated and a tubing arranged inside the container through which a liquid to be degassed is guided, wherein the tubing is made of a semi-permeable material through which gas contained in the liquid can be removed by effect of the container being evacuated, the method comprising:
obtaining a time series of values indicative of pressures inside the container, wherein the time series spans a period during which the container is evacuated or pressurized; and
processing the time series to estimate an amount of liquid in the container that has passed through the tubing; and
determining a liquid level state of the degasser based on the estimated amount of liquid, thereby determining a state of the degasser.

2. The method of claim 1, wherein determining the liquid level state of the degasser based on the time series includes using a model of a pressurization or evacuation process of the container parameterized by an amount of liquid present in the container.

3. The method of claim 2, wherein the model uses a free volume of the container as a free parameter.

4. The method of claim 1, wherein determining the liquid level state of the degasser based on the time series includes analyzing a shape of the time series.

5. The method of claim 1, wherein determining the liquid level state of the degasser based on the time series includes evaluating one or more of:
   a pressure level at a predetermined time;
   a magnitude of a pressure drop;
   a magnitude of a pressure rise;
   a speed of a pressure drop; and
   a speed of a pressure rise.

6. The method of claim 1, wherein the steps of obtaining a time series and determining a liquid level state are automatically performed in regular intervals and/or in reaction to predetermined trigger events.

7. The method of claim 6, wherein the steps of obtaining a time series and determining a liquid level state are automatically performed during start-up or in a check-up procedure.

8. The method of claim 1, wherein determining a liquid level state of the degasser includes determining whether the degasser is in one of two or more discrete states.

9. The method of claim 8, wherein the discrete states include two or more of a normal state in which a liquid level is tolerable and at least one critical state in which the liquid level is approaching a critical level.

10. The method of claim 8, wherein the discrete states include multiple critical states which require different types of interventions.

11. The method of claim 8, wherein each discrete state corresponds to a particular range of liquid levels in the container.

12. The method of claim 1, further comprising depending on the determined liquid level state of the degasser, automatically triggering a response of the automated analyzer.

13. The method of claim 12, wherein the response includes one or more of:
   logging the time series of values,
   outputting an information regarding the liquid level state on a user interface of the automated analyzer,
   outputting a warning,
   triggering and scheduling a preventative maintenance measure,
   scheduling a service or maintenance operation, and
   stopping operation of the degasser and/or the analyzer.

14. The method of claim 1, further comprising automatically informing one or more of different receivers regarding the liquid level state of the degasser.

15. The method of claim 1, further comprising predicting a critical degasser state based on multiple determinations of the liquid level state.

16. The method of claim 15, wherein predicting a critical degasser state based on multiple determinations of the liquid level state includes extrapolating the liquid level state based on the multiple determinations to predict a future development of the liquid level in the container.

17. A computer system configured to carry out the steps of claim 1.

18. The computer system of claim 17, wherein the computer system is a controller of an analyzer.

19. A non-transitory computer-readable medium having instructions stored thereon which when carried out by a computer system prompt the computer system to carry out the steps of claim 1.

* * * * *